Oct. 18, 1966    J. J. DUFFY ETAL    3,279,486
INHIBITOR VALVE GOVERNOR
Filed May 15, 1963    2 Sheets-Sheet 1

INVENTOR.S:
JAMES J. DUFFY
BY RICHARD L. LEONARD
ATTORNEYS

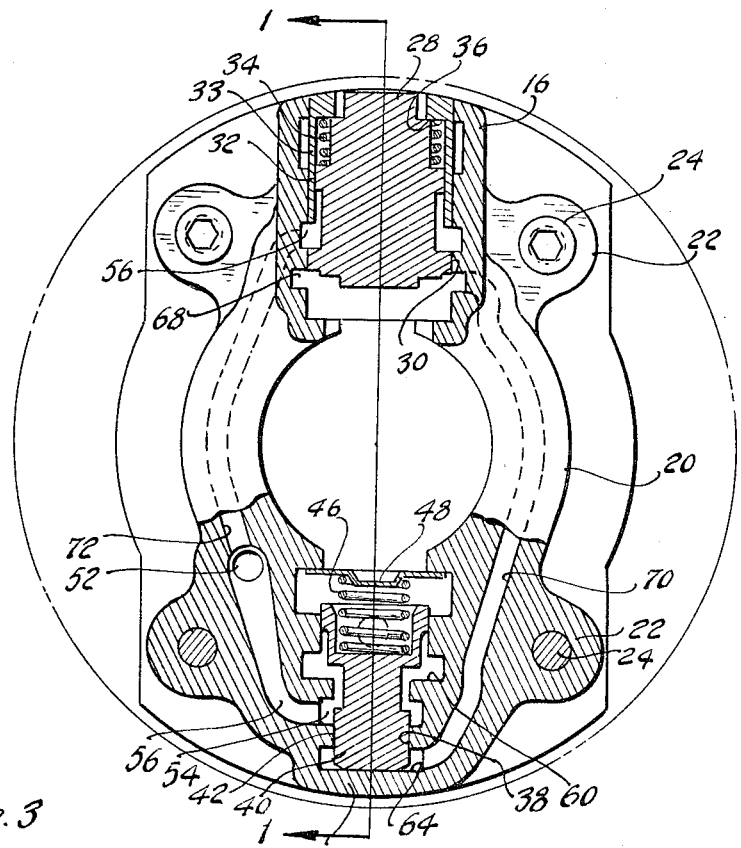
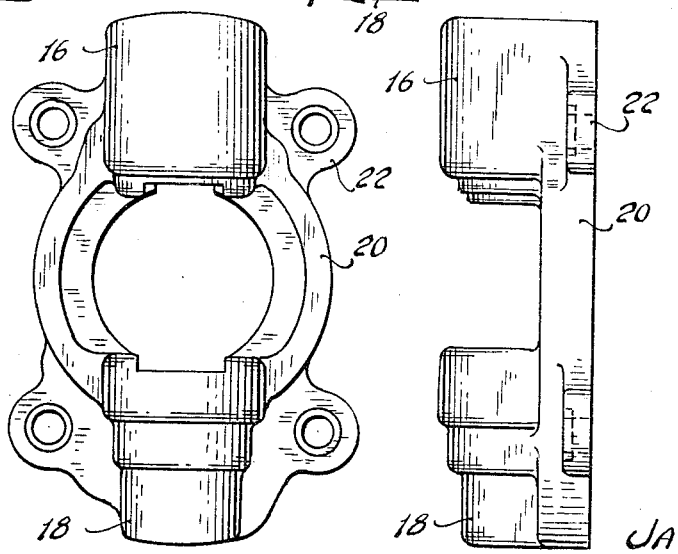

United States Patent Office 3,279,486
Patented Oct. 18, 1966

3,279,486
INHIBITOR VALVE GOVERNOR
James J. Duffy, Livonia, and Richard L. Leonard, Farmington, Mich., assignors to Ford Motor Company, Dearborn, Mich., a corporation of Delaware
Filed May 15, 1963, Ser. No. 280,671
5 Claims. (Cl. 137—54)

Our invention relates generally to a governor valve mechanism for establishing a speed signal that is proportional in magnitude to the speed of a driven member. The improved structure of our invention is adapted especially to be used in an automatic control valve system for a multiple speed ratio power transmission mechanism.

The subject matter of this disclosure is an improvement in the governor valve mechanism disclosed in Patent No. 3,048,184. It is capable of providing a pressure speed signal that is related functionally in magnitude to the driven speed of a driven member. This relationship is similar to the corresponding relationship of the patented construction. We have achieved this result, however, by employing an improved mode of cooperation between the various valve elements of the governor mechanism.

When our improved governor mechanism is employed in the automatic control valve circuit of an automatic power transmission mechanism for a wheeled vehicle, it provides a pressure signal that is proportional in magnitude to the driven speed of the transmission driven member when the speed of the driven member is greater than a predetermined design value, such as 500 r.p.m. At speeds less than the design value, however, the speed signal is reduced to zero. The speed signal is utilized by each of two shift valve elements situated in an automatic control valve circuit having a fluid pressure source and fluid pressure operated servos. The shift valve elements control selectively the distribution of pressure from the source to the servos to accomplish speed ratio changes. The speed signal of our improved governor mechanism acts upon the shift valves to initiate a speed response. The shift valves are subjected also to a control signal that is an indicator of the torque delivery requirements of the mechanism.

It is necessary in a control valve system of this type to provide a speed signal that can be utilized by the control valve circuitry to establish each of two shift points. This is achieved in our improved governor mechanism by inhibiting the action of the signal generating elements of the mechanism at a vehicle speed less than the predetermined design value. When the speed exceeds that value, the speed signal will increase abruptly in magnitude from zero to a calibrated value. At this instant the first speed ratio shift is obtained.

A second speed ratio shift is achieved upon an increase in the governor pressure beyond the pressure that exists at the design speed. This, therefore, makes it possible to calibrate the pressure modulating portion of the mechanism to establish only one additional shift point since the first shift point is reached at the instant the governor valve mechanism becomes operative. This eliminates the need for providing two modulator valve elements, and the calibration of the mechanism is simplified accordingly. No design compromise in shift quality is required. Each shift point can be established without reference to variables that would affect the other.

In addition to the speed signal, a signal that is proportional in magnitude to engine manifold pressure or engine torque demand is used to delay the shift point upon an increase in vehicle speed. The degree of delay is dependent upon the magnitude of the engine torque being delivered. The multiple speed ratio power transmission mechanism normally is conditioned for an upshift from an underdrive ratio to a direct drive ratio by clutching together two elements of the gear unit and releasing in timed sequence a reaction element of the gear unit. That reaction element normally is held stationary by a friction brake. Under high torque delivery conditions it therefore is desirable to delay the shift point to avoid slipping of the direct drive clutch following an upshift from an underdrive ratio to the direct drive ratio. Thus, the underdrive ratio will be available for acceleration purposes for a longer period. Our improved governor mechanism is designed to delay the instant at which the governor signal will be made available to the control circuit to initiate a 1–2 upshift. This delay is dependent upon the magnitude of the torque being delivered. A typical torque demand sensitive control system is disclosed in pending application Serial Number 6,703, filed February 4, 1960, now United States Patent No. 3,095,755.

The provision of an improved governor valve mechanism of the type set forth being a principal object of our invention, it is a further object of our invention to provide a governor valve mechanism which is reliable in operation and which can be employed to establish two spaced shift points in an automatic transmission control valve circuit by employing a single valve modulator element.

It is a further object of our invention to provide a governor valve mechanism of the type above set forth wherein the modulator valve element is situated on one side of the axis of rotation of a driven member and a so-called inhibitor valve element is situated on the opposite side of the driven member, the mass of each valve element and the associated valve bodies being substantially balanced thereby eliminating the necessity for a counterweight.

It is a further object of our invention to provide a governor mechanism of the type above set forth and which requires a limited amount of space.

For the purpose of describing more particularly the improvements of our invention, reference will be made to the accompanying drawings wherein:

FIGURE 1 is taken along the plane of section line 1—1 of FIGURE 2;

FIGURE 2 shows a cross sectional view taken along the plane of section line 2—2 of the structure of FIGURE 1;

FIGURE 3 is a front elevation view of the structure of FIGURE 1;

FIGURE 4 is a side view of the structure of FIGURES 1–3; and

Figure 1:
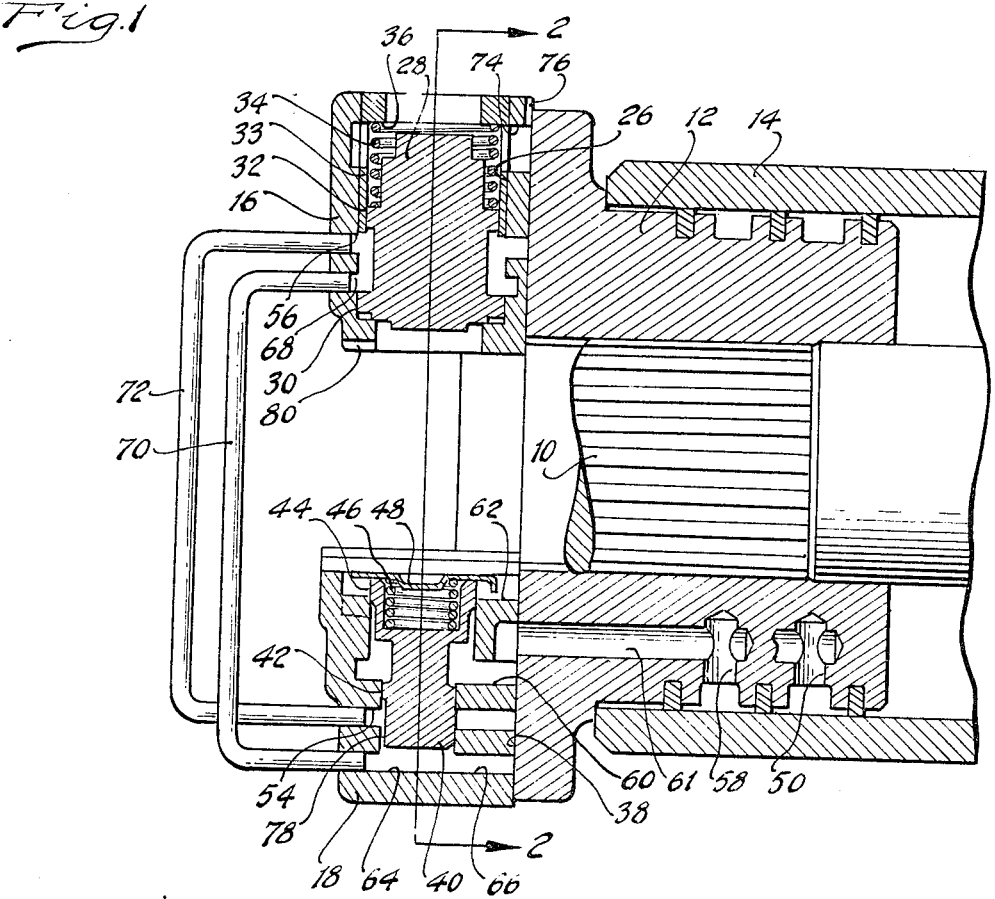
FIGURE 1 shows a longitudinal cross sectional view of our governor valve assembly.
Figure 5:
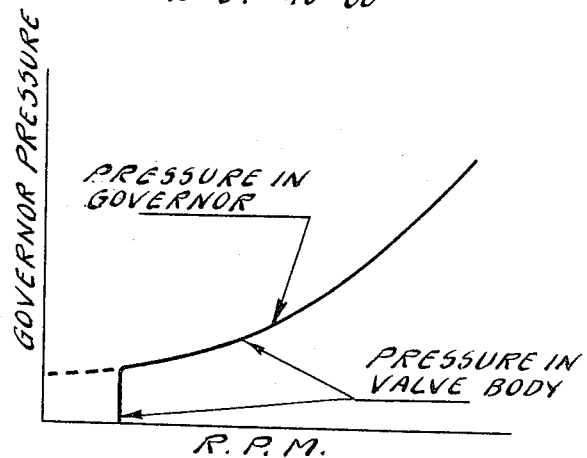
FIGURE 5 is a chart showing the performance characteristics of our improved governor mechanism.

Referring first to FIGURE 1, the power output tailshaft of a power transmission mechanism is generally indicated by reference character 10. Splined to this shaft 10 is a pressure distributor manifold 12 which may be received within a cooperating stationary sleeve 14.

Secured to manifold 12 is a governor valve body having two integral parts 16 and 18. The governor body, which is formed as a single piece casting, includes a central portion 20 which surrounds the shaft 10.

The governor body includes flanges 22 through which are received clamping bolts 24 which are used to secure the governor body to the manifold 12. Governor body part 16 is formed with a radially extending valve opening 26 within which is situated a primary inhibitor valve 28. This valve is formed with a pair of spaced valve lands 30 and 32 which are received within cooperating internal valve lands in the opening 26. A valve sleeve 33 is received within bore 26 to provide differential land diameters. Land 30 is formed with a greater diameter than land 32.

A calibrating valve spring 34 may be situated between valve 28 and an internal shoulder 36 on the radially outward end of sleeve 33.

Governor body portion 18 includes a valve opening 38 within which is situated a differential diameter valve element 40. This element includes a small diameter valve land 42 and a relatively large diameter valve land 44, each land slidably cooperating with an internal valve land formed in the opening 38.

Valve element 40 is urged normally in a radially outward direction by valve spring 46 which may be seated upon a spring seat 48. It is engageable with a shoulder formed in the radially inward region of the valve body part 18.

Line pressure from a control pump for an automatic control valve circuit is distributed to the manifold 12 and passes into a line pressure passage 50. This passage in turn communicates with a line pressure port 52 in the governor body part 18 as indicated in FIGURE 2. Port 52 communicates with an annular groove 54 through a passage 56 formed in the governor body.

A governor pressure outlet passage also is formed in the manifold 12 as indicated at 58. It communicates with an annular groove 60 in the valve opening 38 by means of a passage 61. The governor that exists in annular groove 60 acts upon the differential area defined by the valve lands 42 and 44 to urge the valve element 40 in a radially inward direction.

An exhaust port indicated at 62 communicates with the valve opening 38 at a radially inward location. The valve land 44 slidably cooperates with port 62 as indicated.

The radially outward end of the valve opening 38 is closed to define a pressure cavity 64 which is defined in part by the radially outward portion of the valve element 40. This cavity 64 communicates with a pressure groove 66 which is in fluid communication with the groove 68 formed in the valve opening 26 of the primary valve element. Grooves 68 and 66 are in fluid communication through an internal passage 70.

Line pressure groove 54 communicates with a groove 56 formed in the opening 26 of the primary valve. This communication is established by an internal passage 72.

The passages 70 and 72 in FIGURE 1 have been illustrated only schematically. They may be formed, however, within the governor body by suitable coring during the governor body casting operation.

An exhaust groove 74 formed in the opening 26 communicates with exhaust port 76. Valve land 32 cooperates slidably with the groove 74.

At low vehicle speeds the primary inhibitor valve element will be urged radially inwardly by reason of the force established by the line pressure acting upon the differential area defined by lands 30 and 32. Fluid communication then is established between grooves 56 and 58 thereby causing line pressure to be distributed to passage 70 and to the pressure cavity 64. This causes valve element 40 to be urged radially inwardly against the opposing force of its valve spring 46. When this occurs, valve land 44 uncovers exhaust port 62 which vents the governor pressure port 60. Thus, the pressure that is made available to passage 61 and governor pressure outlet passage 58 is equal to zero.

When the valve element 40 assumes a radially inward position, valve land 42 blocks line pressure groove 54. If desired, land 42 can be provided with grooves 78 which establish communication between passages 72 and 70 when the valve element 40 assumes a radially inward position.

The existence of pressure in cavity 64 will prevent the valve element 40 from establishing a modulated pressure. After a predetermined speed of operation is achieved, however, the centrifugal force acting upon valve element 28 due to its mass will move the valve element 28 radially outwardly against the opposing force of the fluid pressure acting upon the differential area of lands 30 and 32. By preference, the spring 34 is of a very low rate. We contemplate, however, that it may be eliminated entirely if this is desired. The valve element 28 therefore will move outwardly with a snap action to interrupt quickly communication between grooves 68 and 56 and establish communication between grooves 68 and the exhaust region at the radially inward end of the bore 26. An exhaust groove 80 communicates with this radially inward region as indicated.

Thus, upon the attainment of a predetermined driven speed, the valve element 40 will assume a modulating position and the output pressure signal in groove 60 and in passage 58 will be related in magnitude to the driven speed. At any speed less than a desired design speed, however, the modulating action of the valve element will be inhibited and the output pressure signal will be zero.

Having thus described a preferred embodiment of our invention, what we claim and desire to secure by U.S. Letters Patent is:

1. A fluid pressure governor for establishing a pressure signal that is proportional in magnitude to the speed of rotation of a rotary member, a valve body carried by said member, a control pressure passage and a governor pressure passage formed in said valve body, a primary valve means carried by said body for modulating said control pressure to establish in said governor pressure passage a speed signal, second valve means carried by said body for inhibiting the modulating action of said primary valve means when said rotary member is rotating at a speed less than a predetermined design value, said second valve means being sensitive to and actuated by said control pressure and having a valve element that is movable by the combined influence of said centrifugal force and the control pressure force to either one of two radially spaced positions, the inhibiting action of said second valve means being effective when and valve element assumes one of said two positions, said second valve means having a radially movable valve element with a pressure area formed thereon which is in communication with said control pressure passage whereby said valve element is urged radially inwardly, a cross flow passage means connecting together said first valve means and said second valve means for distributing control pressure through said second valve means from said control pressure passage to said first valve means, said control pressure acting upon said first valve means to inhibit its modulating action when said second valve means it urged radially inwardly against the opposing centrifugal force.

2. A governor valve mechanism for use in establishing a pressure signal that is proportional in magnitude to the speed of rotation of a rotary member, a valve body carried by said rotary member, a control pressure passage and a governor pressure passage formed in said valve body, a first centrifugally responsive valve means in said valve body adapted to modulate the pressure in said control pressure passage to establish a governor pressure in said governor pressure passage that is proportional in magnitude to the speed of rotation of said rotary member, said valve means being subjected to said governor pressure whereby opposed valve actuating forces are established, and second valve means responsive to centrifugal force and the pressure force established by said pressure in said control pressure passage to inhibit the modulating action of said first valve means during operation of said rotary member at speeds less than a predetermined design value, said second valve means having a radially movable valve element with a pressure area formed thereon which is in communication with said control pressure passage whereby said valve element is urged radially inwardly, a cross flow passage means connecting together said first valve means and said second valve means for distributing control pressure through said second valve means from said control pressure passage to said first valve means, said control pressure acting upon said first valve means to inhibit its modulating action when said second valve means is urged radially inwardly against the opposing centrifugal force.

3. A fluid pressure governor for establishing a pressure signal that is proportional in magnitude to the speed of rotation of a rotary member, a unitary valve body carried by said member, a control pressure passage and a governor pressure passage formed in said valve body, a primary valve means carried by said body for modulating said control pressure to establish in said governor pressure passage a speed signal, second valve means carried by said body for inhibiting the modulating action of said first valve means when said rotary member is rotating at a speed that is less than a predetermined design value, said second valve means being sensitive to and actuated by said control pressure and movable under centrifugal force to a radially outward position whereby its inhibiting action is interrupted, said first valve means and said second valve means being situated on opposed sides of the axis of rotation of said rotary member in juxtaposed relationship whereby the mass of one will counterbalance the mass of the other, said second valve means having a radially movable valve element with a pressure area formed thereon which is in communication with said control pressure passage whereby said valve element is urged radially inwardly, a cross flow passage means connecting together said first valve means and said second valve means for distributing control pressure through said second valve means from said control pressure passage to said first valve means, said control pressure acting upon said first valve means to inhibit its modulating action when said second valve means it urged radially inwardly against the opposing centrifugal force.

4. A governor valve mechanism for use in establishing a pressure signal that is proportional in magnitude to the speed of rotation of a rotary member, a valve body carried by said rotary member, a control pressure passage and a governor pressure passage formed in said valve body, a first centrifugally responsive valve means in said valve body adapted to modulate the pressure in said control pressure passage to establish a governor pressure in said governor pressure passage that is proportional in magnitude to the speed of rotation of said rotary member, said valve means being subjected to said governor pressure whereby opposed valve actuating forces are established, and second valve means responsive to centrifugal force and the pressure force established by said pressure in said control pressure passage to inhibit the modulating action of said first valve means during operation of said rotary member at speeds less than a predetermined design value, said first valve means and said second valve means being situated on opposed sides of the axis of rotation of said rotary member in juxtaposed relationship, said second valve means having a radially movable valve element with a pressure area formed thereon which is in communication with said control pressure passage whereby said valve element is urged radially inwardly, a cross flow passage means connecting together said first valve means and said second valve means for distributing control pressure through said second valve means from said control pressure passage to said first valve means, said control pressure acting upon said first valve means to inhibit its modulating action when said second valve means is urged radially inwardly against the opposing centrifugal force.

5. A fluid pressure governor capable of establishing a pressure signal that is proportional in magnitude to the speed of rotation of a rotary member, a valve body carried by said rotary member, a control pressure passage in the governor pressure passage formed in said valve body, first valve means carried by said valve body for modulating said control pressure to establish in said governor pressure passage a speed signal, and second valve means operatively connected to said first valve means and carried by said valve body, said second valve means being responsive to the control pressure in said control pressure passage to inhibit the modulating action of said first valve means when the speed of rotation of said rotary member is less than a predetermined value for any given magnitude of said control pressure, said second valve means having a radially movable valve element with a pressure area formed thereon which is in communication with said control pressure passage whereby said valve element is urged radially inwardly, a cross flow passage means for distributing control pressure through said second valve means from said control pressure passage to said first valve means, said control pressure acting upon said first valve means to inhibit its modulating action when said second valve means is urged radially inwardly against the opposing centrifugal force.

References Cited by the Examiner

UNITED STATES PATENTS

| 2,683,810 | 11/1954 | McFarland | 137—54 X |
| 2,711,749 | 6/1955 | Hettinger | 137—56 |
| 2,876,784 | 3/1959 | Adams | 137—56 |
| 2,911,987 | 11/1959 | Wayman | 137—56 X |
| 3,048,184 | 8/1962 | Duffy | 137—54 X |

WILLIAM F. O'DEA, *Primary Examiner.*

CLARENCE R. GORDON, *Examiner.*